Nov. 13, 1945.  H. A. HOFGREN  2,388,973
AIRPLANE
Filed Oct. 18, 1941   2 Sheets-Sheet 1
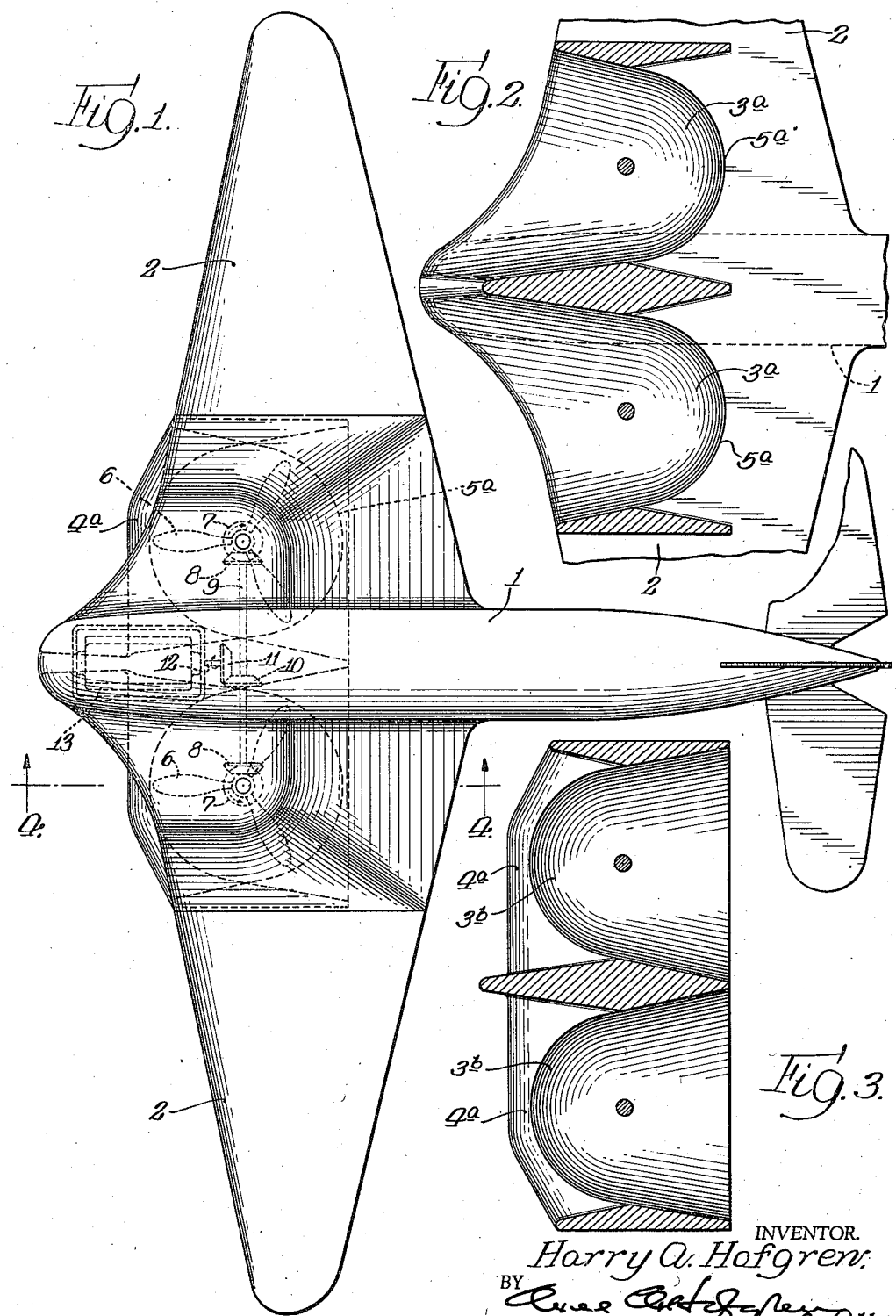

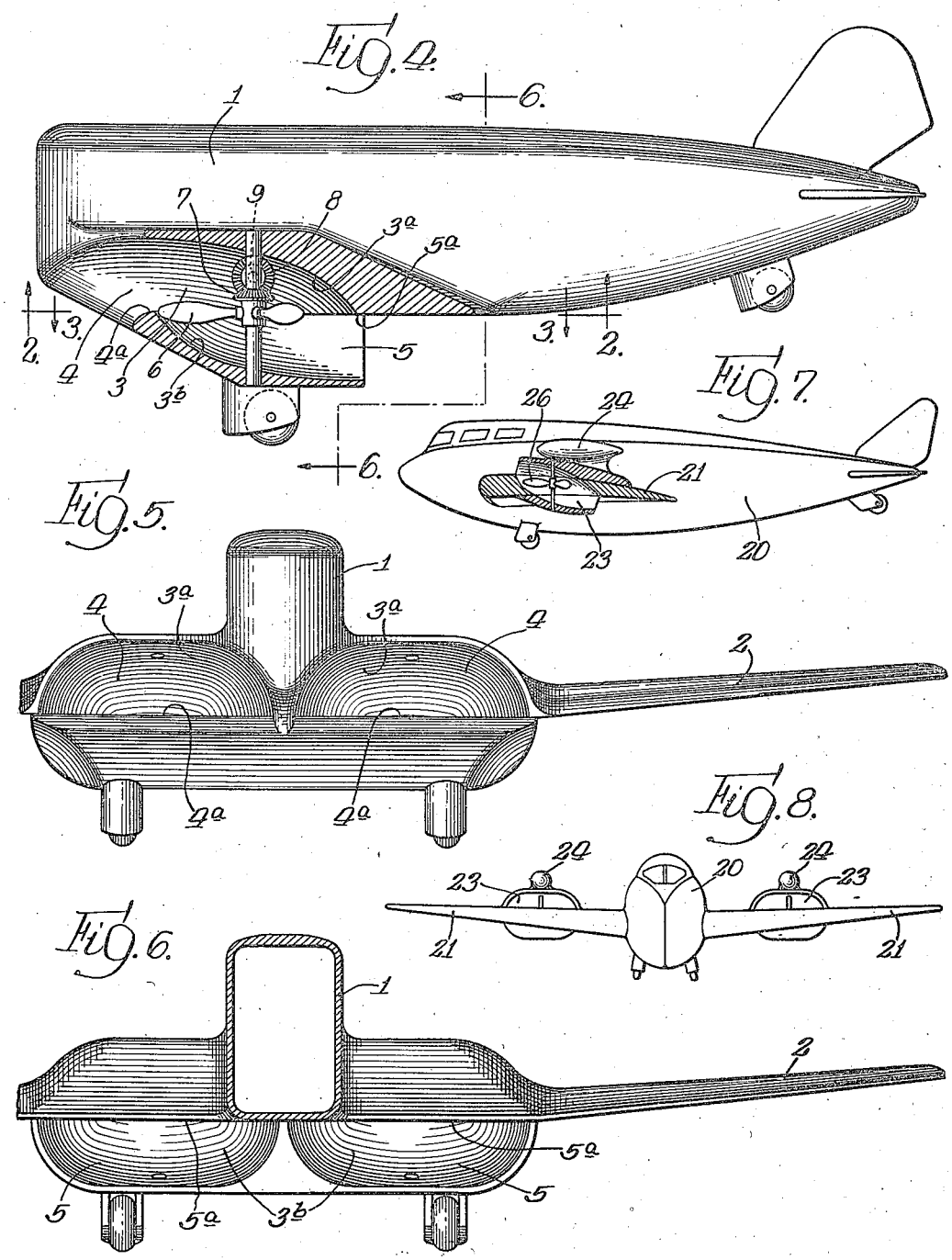

Patented Nov. 13, 1945

2,388,973

UNITED STATES PATENT OFFICE 2,388,973

AIRPLANE

Harry A. Hofgren, Chicago, Ill.

Application October 18, 1941, Serial No. 415,595

3 Claims. (Cl. 244—15)

This invention relates to aircraft construction of the heavier-than-air type, and it is illustrated as applied to an airplane of more or less conventional design, except as to the particular features which are the subject-matter of the invention.

One object of the invention is to provide an airplane in which the propellers are so located and mounted that the gyroscopic effect of their motion will contribute a notable stabilizing effect, tending to steady the plane in a horizontal position and to hold it on a given course.

Another object of the invention is to provide an airplane with propellers mounted in relatively protected positions within the outlines of the wings or adjacent structure.

More specifically, it is an object of the invention to provide an airplane with propellers mounted for rotation in substantially horizontal planes or in a common horizontal plane, that is, in a plane which extends normally in the general direction of flight, and to provide, in combination with such propellers, suitable airflow passages through which the air is driven by the propellers to produce traction and lifting power by which the plane is propelled and maintained in flight.

Other objects and advantages will appear from the following description taken in connection with the accompanying drawings, in which:

Fig. 1 is a top plan view of an airplane embodying this invention showing, in dotted outline, a pair of propellers and a motor operatively connected thereto.

Fig. 2 is a fragmentary horizontal section taken as indicated at line 2—2 on Fig. 4 to show the upper walls of the airflow passages.

Fig. 3 is a plan section taken as indicated at line 3—3 on Fig. 4 to show the bottom walls of the airflow passages.

Fig. 4 is a longitudinal vertical section taken substantially as indicated at line 4—4 on Fig. 1 through one of the airflow passages and showing the fuselage in side elevation.

Fig. 5 is a partial front elevation.

Fig. 6 is a partial rear elevation taken partly in section as indicated at line 6—6 on Fig. 4.

Fig. 7 is a side elevation partly in section, on a smaller scale than preceding views and showing a modification in which the airflow passages extend through the wings, each at some distance from the fuselage, and in which separate engines are employed for the two propellers.

Fig. 8 is a front elevation of the construction shown in Fig. 7.

While there are shown in the drawings and described herein two forms of the invention, it is to be understood that the invention is not limited to the specific forms or structures herein disclosed, but that it is the intention to cover all modifications and alternative constructions falling within the scope of the claims. It may also be understood that in the drawings many details of conventional airplane design are omitted, so that the drawings may be considered as largely diagrammatic and as showing primarily the relation of the present invention to familiar or conventional features of airplane design.

As illustrated in Figs. 1 to 6, the airplane includes a fuselage 1, and is of the monoplane type, with wings 2, 2 extending outwardly at opposite sides of the fuselage. The plane may be considered as of the cabin type, but details, such as windows, doors and seating arrangement, are omitted in order to simplify the drawings; and it may be understood that the invention is equally applicable to a plane of the open cockpit type.

Interposed between the fuselage 1 and each wing 2 there is provided a structure which forms an airflow passage 3, extending fore-and-aft and having an inlet opening 4 at the forward end and an outlet or air discharge opening 5 at the rear end of the passage. In general, each of the passages 3 trends rearwardly and downwardly, the inlet opening 4 being disposed at a level above that of the outlet opening 5. In the particular design illustrated the lower edge 4ª of the inlet opening 4 is at substantially the same plane as the upper edge 5ª of the outlet or discharge opening and at the horizontal plane which connects the edge 4ª with the edge 5ª, the cross-section of the passage 3 is substantially circular. This provides a circular space in which a propeller is mounted for rotation, as indicated in dotted outline at 6 on Fig. 1.

Preferably, the two propellers 6, 6 are arranged to be driven in opposite directions, and their blades are pitched so as to draw air through the passages 3, 3 from the inlet openings 4, 4, discharging the air through the outlets 5, 5. This movement of the air, induced by the operation of the propellers 6, 6, is relied upon for traction, causing the airplane to move forward, and its forward motion at sufficient speed will cause it to rise and to sustain itself in flight in accordance with the well understood operation of the wings 2, 2, which may be provided with the usual flaps or ailerons, not shown.

In the design illustrated, and particularly as shown in Figs. 2, 3 and 4, the rear portion 3ª of the top wall of the passage 3 is spherically rounded or dome-shaped, providing a smoothly curved surface trending downwardly toward the horizontal plane of circular cross-section, which is the plane indicated at line 3—3 on Fig. 4, and which is also the plane of section at which Figs. 2 and 3 are taken. The forward portion 3ᵇ of the bottom wall of the passage 3 adjacent the inlet 4, is also spherically rounded or dome-shaped, providing a smoothly curved surface trending downwardly from the circular area in which the propeller 6 is mounted for rotation. Thus the flow of air through the passage 3 is directed, first, horizontally through the inlet 4, and is then deflected downwardly by the dome-shaped upper wall 3ᵃ being drawn down by the action of the propeller and again deflected by the curved bottom wall 3ᵇ so as to emerge in a substantially horizontal direction at the outlet 5.

As shown in Figure 1, the two propellers 6, 6 are provided with bevel gears 7, 7, meshing respectively with bevel gears 8, 8 on opposite sides of a transverse shaft 9 which is connected by bevel gears 10 and 11 with the shaft 12 of an engine indicated at 13, which may be of any suitable type. With this arrangement the propellers are automatically synchronized and are driven simultaneously in opposite directions. Accordingly, their blades will be of opposite pitch, and, preferably, these propellers are of the adjustable type, provided with any suitable form of control for varying their pitch, as may be required in the operation of the plane. If the pitch of each propeller is adjustable independently of that of the other, the resulting variation in effective driving power may be utilized under certain conditions for controlling the direction of flight; and when these propellers are adjusted at zero positions at which they have no effective pitch they will provide a braking effect by choking the flow of air through the passages.

Figs. 7 and 8 illustrate a modified arrangement in which the airflow passages 23, 23 are not formed directly adjacent the fuselage 20, but are incorporated in the wings 21. The propeller 26 in each of these passages 23 is provided with its own separate motor, housed in a stream-lined enclosure 24 mounted above the passage 23 and extending rearwardly of the vertical axis of the propeller 26. It may be understood that suitable control means, not shown, is provided for synchronizing the propellers 26, 26 and controlling their speed and adjusting their pitch at will. The passages 23, 23 may be substantially similar in contour to the passages 3, 3 already described, although the greater depth of the wings through which these passages extend gives the passages some added length in the vertical direction.

One important advantage of mounting the propellers 6, 6 or 26, 26 for rotation in a substantially horizontal plane parallel to the normal direction of flight and approximately coincident with the plane of the wings, is that the gyroscopic effect produced by the spinning of the propellers will tend to stabilize the airplane and hold it in a position for sustained flight and travel. This will be particularly advantageous in the case of small, light planes designed for use by relatively amateur pilots and it will also be valuable in transport planes, which are intended primarily for straight-line travel at high speed, but are not called upon to perform sudden or complicated maneuvers in the air. The engine arrangement suggested in Figs. 7 and 8 will be preferable for the latter type of plane, leaving the fuselage comparatively clear as a cabin for passengers and pilot, while the arrangement shown in Figs. 1 to 6 may be found preferable and satisfactory in smaller planes intended to accommodate only one or two persons.

I claim as my invention:

1. In an airplane, a fuselage with wings extending outwardly at both sides and structure forming a pair of passages extending fore-and-aft at opposite sides of the fuselage respectively and in symmetrical relation thereto and inclined downwardly from fore to aft, an intermediate portion of each passage having a substantially circular cross-section at an approximately horizontal plane, the top wall of said passage over the rear half of said circular area being dome-shaped, curving downwardly to the plane of said circular cross-section, and the bottom wall of the passage directly under the forward half of said area being of inverted dome formation, curving downwardly and rearwardly from said plane of circular cross-section, and a propeller mounted in each passage for rotation in said plane and operable to drive the airplane.

2. In an airplane, a fuselage with wings extending outwardly at both sides and structure forming a pair of passages extending fore-and-aft at opposite sides of the fuselage in symmetrical relation thereto and inclined downwardly from fore to aft, an intermediate portion of each passage having a substantially circular cross section at an approximately horizontal plane, the top wall of said passage over the rear half of said circular area being dome-shaped, curving downwardly to the plane of said circular cross section, and the bottom wall of the passage directly under the forward half of said area being of inverted dome formation, curving downwardly and rearwardly from said plane of circular cross section, and a screw-type propeller mounted in each of said passages for rotation in said plane of circular cross section, said propeller being of a diameter approximating the diameter of said circular portion of the passage and being arranged to rotate in a direction to draw air downwardly at said plane to drive the airplane.

3. In an airplane, a fuselage with wings extending outwardly at both sides and structure forming a pair of passages extending fore-and-aft at opposite sides of the fuselage in symmetrical relation thereto having forwardly facing inlet openings and rearwardly facing outlet openings and intermediate portions inclined downwardly from fore to aft, the intermediate portion of each passage having a substantially circular cross section at an approximately horizontal plane, the top wall of said passage over said circular area trending downwardly and rearwardly toward said plane of circular cross section, and the bottom wall of the passage directly under said area trending downwardly and rearwardly from said plane of circular cross section, and a screw-type propeller mounted in each of said passages for rotation in said plane of circular cross section and in a direction to draw air in through the horizontal inlet portions downwardly in the general direction of the axis of rotation of the propellers at said plane and to force the air out through the horizontal outlets to drive the airplane.

HARRY A. HOFGREN.